(12) United States Patent
Lee et al.

(10) Patent No.: US 7,969,162 B2
(45) Date of Patent: Jun. 28, 2011

(54) METHOD AND DEVICE FOR DYNAMIC ADJUSTMENT OF NETWORK OPERATING VOLTAGE

(75) Inventors: Chieh-Sheng Lee, Miaoli County (TW); Liang-Wei Huang, Taipei (TW); Jiun-Hung Yu, Nantou (TW); Shieh-Hsing Kuo, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

(21) Appl. No.: 12/913,988

(22) Filed: Oct. 28, 2010

(65) Prior Publication Data

US 2011/0043221 A1 Feb. 24, 2011

Related U.S. Application Data

(63) Continuation of application No. 11/652,629, filed on Jan. 12, 2007, now Pat. No. 7,839,152.

(30) Foreign Application Priority Data

Jan. 19, 2006 (TW) .............................. 95102004 A

(51) Int. Cl.
*G01R 27/28* (2006.01)
(52) U.S. Cl. ........................................ 324/614; 324/612
(58) Field of Classification Search .................. 324/614
See application file for complete search history.

(56) References Cited

U.S. PATENT DOCUMENTS

| | | | |
|---|---|---|---|
| 4,905,102 A * | 2/1990 | Schulz | 360/46 |
| 5,598,406 A | 1/1997 | Albrecht et al. | |
| 5,778,204 A | 7/1998 | Van Brunt et al. | |
| 6,424,820 B1 | 7/2002 | Burdick et al. | |
| 6,597,689 B1 | 7/2003 | Chiu et al. | |
| 7,065,162 B1 | 6/2006 | Sorrells et al. | |
| 7,143,014 B2 | 11/2006 | Upreti | |
| 7,839,152 B2 * | 11/2010 | Lee et al. | 324/614 |
| 2004/0153679 A1 | 8/2004 | Fitton et al. | |

FOREIGN PATENT DOCUMENTS

JP 57-25021 A 2/1982

(Continued)

OTHER PUBLICATIONS

Texas Instruments, 3-Port Cable Arbiter, Specification Sheet, TSB81BA3, Oct. 2003, p. 1-50.

(Continued)

*Primary Examiner* — Thomas Valone
(74) *Attorney, Agent, or Firm* — Thomas, Kayden, Horstemeyer & Risley, LLP

(57) ABSTRACT

The present invention is to provide a method and device of dynamically adjusting the operating voltage of a network integrated circuit including the steps of detecting and ranking the signal-to-noise ratio of N ports to single out a port for arbitration, dynamically controlling the operating voltage according to the signal-to-noise ratio of the port for arbitration, decreasing the operating voltage by a voltage unit when the signal-to-noise ratio of the port for arbitration is greater than a first threshold, increasing the operating voltage to a default operating voltage when the signal-to-noise ratio of the port for arbitration is smaller than the first threshold, decreasing the operating voltage by a voltage unit when the signal-to-noise ratio of the port for arbitration is greater than a second threshold, and increasing the operating voltage by a voltage unit when the signal-to-noise ratio of the port for arbitration is smaller than the second threshold.

17 Claims, 1 Drawing Sheet

FOREIGN PATENT DOCUMENTS

| | | |
|---|---|---|
| KR | 2003 0025131 | 3/2003 |
| WO | 2005/125012 A1 | 12/2005 |
| WO | 2007/012017 A2 | 1/2007 |

OTHER PUBLICATIONS

Radio Electronics, Signal to Noise Ratio, Radio-Electronics.com, p. 1-5, May 2003.

PTO Translation, Hwang, Dong-Yun, "Output Voltage Adjustor for Power Line Modem", KR20030025131, Mar. 28, 2003.

Hwang, KIPO machine translation, KR 20030026131, Sep. 19, 2001, p. 1-5.

German Office Action dated Oct. 28, 2010.

English translation of German Office Action dated Oct. 28, 2010, entered Jan. 19, 2011.

* cited by examiner

METHOD AND DEVICE FOR DYNAMIC ADJUSTMENT OF NETWORK OPERATING VOLTAGE

CROSS-REFERENCE TO RELATED APPLICATIONS

The present application is a continuation of U.S. patent application Ser. No. 11/652,629, filed Jan. 12, 2007, which claimed priority to Taiwan application number 095102004, filed Jan. 19, 2006. The contents of these applications are incorporated herein by reference.

FIELD OF THE INVENTION

The present invention relates to a power-saving method for an integrated circuit (IC) and more particularly to method and device of dynamically adjusting an operating voltage of a network IC according to signal-to-noise ratios (SNRs) measured from ports thereof, so as to minimize the power consumption of the network IC.

BACKGROUND OF THE INVENTION

Ethernet is still the core of LAN (local area network) in view of technology. Conventionally, most data is transferred over Ethernet at a rate of 100 Mbps (million bits per second). Typically, an auto-negotiation mechanism is performed for rate or other conversions in order to increase the rate from 10 Mbps to 100 Mbps. However, the auto-negotiation mechanism is no longer appropriate in a Gigabit transferring rate, while one of the bottlenecks being the transferring medium. Typically, twisted pair lines and coaxial cables are employed as medium for LAN, with the signals transmitting along the twisted pair lines and coaxial cables in the form of electromagnetic waves. Thus, electromagnetic interference (EMI), cross talk or the like are occurring in the signal transmission. Typically, a metal shield is formed around the twisted pair line or coaxial cable for eliminating EMI and cross talk. However, such problems of EMI and cross talk are so serious in high frequencies that it would be too difficult to be solved with general approaches.

Thus, most undesirable factors are considered in designing a circuitry of a network IC in order to enable the network IC to operate normally in different operating environments including the worst cases, giving the designed network IC a higher tolerance. However, such designs increase circuit area and power consumption as a tradeoff. An internal regulator is usually provided in a Gigabit network IC for adjusting the default operating voltage of the IC, being controlled by a device (e.g., computer or the like). Rather than having the computer adjust the required operating voltage of the internal regulator in response to the quality of signals being transmitted along the medium in the meantime automatically, such adjustments could only be done by a network management staff member by operating a computer or the like in response to the current conditions and requirements.

Therefore, it is desirable among network IC designers to provide a novel method and device capable of decreasing power consumption, and at the same time achieving the required performance in order to overcome the inadequacies of the prior art.

SUMMARY OF THE INVENTION

It is an object of the present invention to provide a method of dynamically adjusting an operating voltage of a network IC, comprising steps of comparing signal qualities of a plurality of ports of the network IC; singling out one of the ports on the network IC for arbitration, based on the compared signal qualities, wherein the singled out port is one having a mean or/and a median signal quality of the plurality of ports; and adjusting the operating voltage of the network IC based on the signal quality of the singled out port.

In one aspect of the present invention for meeting a specific requirement, it is possible of selecting a port having a best signal quality, a second best signal quality, or one best adapted to the current condition as the port for arbitration.

It is another object of the present invention to provide a device of dynamically adjusting an operating voltage of a network IC, comprising a signal comparison unit configured to single out a reference port for arbitration from a plurality of ports for arbitration based on compared signal qualities among the plurality of ports, wherein the singled out port is one having a mean or/and a median signal quality is taken as a predetermined reference value for singling out the port for arbitration; and a voltage regulation control unit for adjusting the operating voltage of the network IC based on the signal quality of the singled out port.

The above and other objects, features and advantages of the present invention will become apparent from the following detailed description taken with the accompanying drawings.

DETAILED DESCRIPTION OF THE PREFERRED EMBODIMENTS

In general, a cable connected to a network card having a transfer rate of 1000 Mbps may have a length between 100 to 140 meters. However, a cable having a length less than 100 meters is sufficient for home applications or intranet applications. In view of the above, for a signal transmitted along any network line or medium, the SNR (signal to noise ratio) of the signal may be compared against a reference value for decreasing or increasing the operating voltage of a network IC as contemplated by the invention. That is, the operating voltage of the network IC is decreased automatically for saving energy when SNR of signals transmitted along a network cable is higher than the reference value (i.e., representing good signal quality). On the other hand, the operating voltage of the network IC is increased automatically to a default operating voltage when the SNR of signals transmitted along a network cable is lower than the reference value (i.e., representing poor signal quality). In brief, the operating voltage of the network IC can be decreased to an optimum as long as the circuit of the network IC is capable of operating normally, and as a result, the overall power consumption of the network IC is decreased significantly.

For ensuring that the operating voltage of the network IC can be adjusted dynamically under regular operating conditions, a threshold is employed with corresponding power level adjustments as a comparison mechanism for SNR. Accordingly, power consumption of the network IC is decreased to a minimum.

Figure 1:
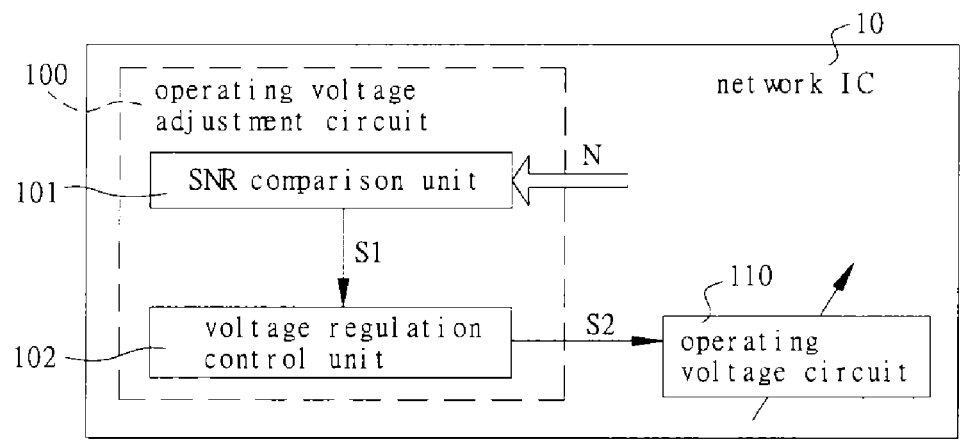
FIG. 1 is a block circuit diagram of network IC for dynamic adjustment of an operating voltage thereof according to the invention.

Referring to FIG. 1, a network IC 10 in accordance with the invention comprises an operating voltage adjustment circuit 100 including an SNR comparison unit 101 and a voltage regulation control unit 102. The SNR comparison unit 101 may compare the SNRs of the received N ports when the network IC 10 is connected to the network. One of the ports is selected as a port for arbitration based on a predetermined reference value (i.e., threshold). Thus, the voltage regulation control unit 102 is capable of correctly performing the threshold based comparison mechanism. In a preferred embodiment of the invention, the port having the lowest SNR is taken as a port for arbitration. A determination signal S1 is generated based on the port having the lowest SNR. The determination signal S1 is then compared with the threshold by the voltage regulation control unit 102. A regulation signal S2 for representing whether the determination signal S1 having a value larger than the threshold or not is then generated. The regulation signal S2 is adapted to dynamically adjust the operating voltage of an operating voltage circuit 110. As an end, power consumption of the network IC 10 is controlled to a minimum.

Figure 2:
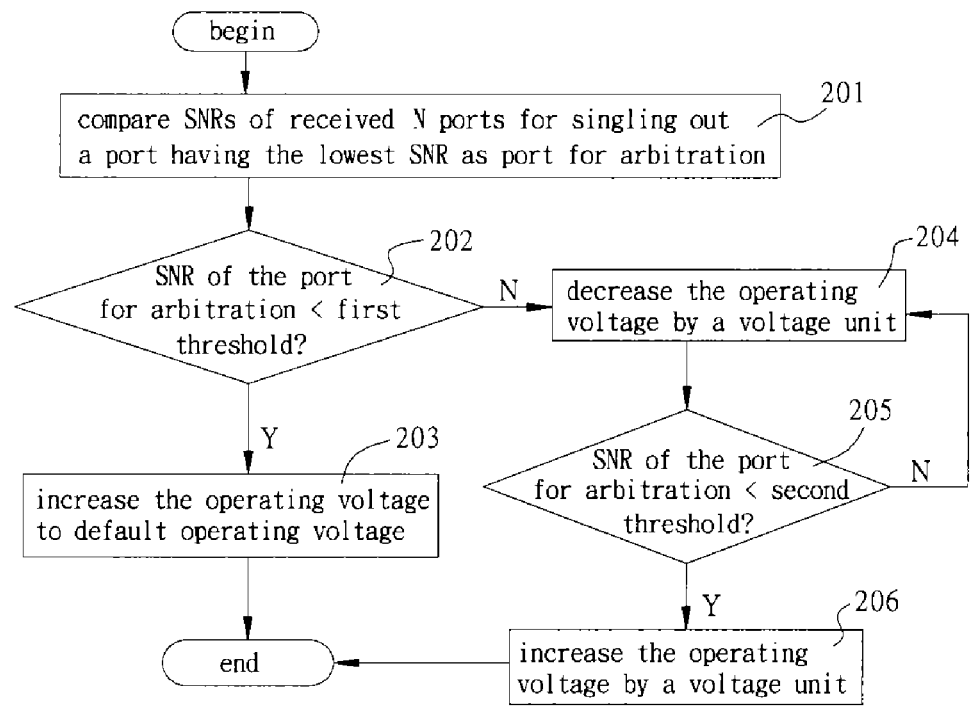
FIG. 2 is a flowchart depicting a process for dynamic adjustment of the operating voltage of the network IC according to a preferred embodiment of the invention.

Referring to FIG. 2, a process for dynamic adjustment of the operating voltage of the network IC according to the invention is illustrated. The process comprises the following steps.

In step 201, SNRs of received N ports are compared for singling out a port having the lowest SNR as a port for arbitration. The process then goes to step 202.

In step 202, compare the SNR of the port for arbitration with a first threshold. The process goes to step 203 if the SNR of the port for arbitration is lower than the first threshold. The process jumps to step 204 if the SNR of the port for arbitration is larger than the first threshold.

In step 203, since it has been determined that the SNR of the port for arbitration is lower than the first threshold, meaning that at least one of the N ports does not operate well enough in this certain operating voltage. The operating voltage is thus increased to a default operating voltage.

In step 204, since all N ports operate normally in the operating voltage, the operating voltage is thus decreased a voltage unit. The process then goes to step 205.

In step 205, compare the SNR of the port for arbitration with a second threshold. The process goes to step 206 if the SNR of the port for arbitration is lower than the second threshold. The process loops back to step 204 if the SNR of the port for arbitration is larger than the second threshold.

In step 206, since it has been determined that the SNR of the port for arbitration is lower than the second threshold, meaning that the port for arbitration no longer operates normally in the operating voltage, the operating voltage is thus increased a voltage unit.

In view of the above embodiment, it is clear that the operating voltage will be decreased by a voltage unit of A if it has determined that the SNR of the port for arbitration is larger than the first threshold. Otherwise, the operating voltage will be increased to the default operating voltage. Further, the operating voltage will be decreased by a voltage unit of B if it has determined that the SNR of the port for arbitration is larger than the second threshold. Otherwise, the operating voltage will be increased by a voltage unit of C.

Note that the port singled out as a port for arbitration is not necessary to be one having the lowest SNR representing the worst signal quality. For example, for meeting a specific requirement (e.g., the offset of performance and efficiency), it is possible of selecting a port having a next lowest SNR, a median SNR, or an average SNR in other embodiments other than the above. Moreover, the steps of adjusting the operating voltage may include a fine adjustment if desired. More than two thresholds may be involved in the process of adjusting the operating voltage. For instance, the number of thresholds for the comparison with the SNR of the port for arbitration is M, where M is an integer larger than or equal to 2. Further, voltage units of B and C may be changed in different thresholds.

Implementation details for the various features and operations described will be well understood by those skilled in the art, in view of the description set forth herein. Accordingly, further description of such implementation details is omitted for purpose of brevity in this disclosure, and should not be construed as limiting on the invention or its embodiments.

To have in mind that the total performance of an electronic device will not decrease suddenly when a digital voltage is decreased to about 20% and an analog voltage is decreased to about 10% respectively. Thus, voltage drop of 20% may be taken as a reference threshold in a digital circuit. Similarly, voltage drop of 10% may be taken as a reference threshold in an analog circuit.

One characteristic of the invention is that the network IC 10 can be configured by setting and modifying software as described above. The operating voltage of the network IC can be adjusted dynamically according to the SNR of a signal transmitted along a network cable. As an end, the purpose of saving energy is achieved in normal operating condition.

While the invention herein disclosed has been described by means of specific embodiments, numerous modifications and variations could be made thereto by those skilled in the art without departing from the scope and spirit of the invention set forth in the claims.

What is claimed is:

1. A device for adjusting an operating voltage of a network integrated circuit (IC), comprising:
    a signal comparison unit configured to single out a reference port for arbitration from a plurality of ports for arbitration based on compared signal qualities among the plurality of ports, wherein the singled out port is one of two ports having the lowest signal quality from among the plurality of ports; and
    a voltage regulation control unit for adjusting the operating voltage of the network IC based on the signal quality of the singled out port.

2. The device of claim 1, wherein the signal quality of the port for arbitration represents the signal qualities of the N ports.

3. The device of claim 2, wherein the operating voltage is decreased by a voltage unit of A when the signal quality of the port for arbitration is larger than a first threshold and is increased to a default operating voltage when the signal quality of the port for arbitration is smaller than the first threshold.

4. The device of claim 2, wherein the operating voltage is decreased by a voltage unit of B when the signal quality of the port for arbitration is larger than a second threshold and is increased by a voltage unit of C when the signal quality of the port for arbitration is smaller than the second threshold.

5. The device of claim 3, wherein the operating voltage is decreased by a voltage unit of B when the signal quality of the port for arbitration is larger than a second threshold and is increased by a voltage unit of C when the signal quality of the port for arbitration is smaller than the second threshold.

6. The device of claim 1, wherein the signal quality is a signal-to-noise (SNR) ratio.

7. A device for adjusting an operating voltage of a network integrated circuit (IC), comprising:
    a signal comparison unit configured to single out a reference port for arbitration from a plurality of ports for arbitration based on compared signal qualities among the plurality of ports, wherein the singled out port is one having a mean or/and a median signal quality is taken as a predetermined reference value for singling out the port for arbitration; and a voltage regulation control unit for adjusting the operating voltage of the network IC based on the signal quality of the singled out port.

8. The device of claim 7, wherein the device is a processor based single chip.

9. The device of claim 7, wherein the signal quality is a signal-to-noise ratio (SNR).

10. A method for adjusting an operating voltage of a network integrated circuit (IC), comprising the steps of:

comparing signal qualities of a plurality of ports of the network IC;

singling out one of the N ports for arbitration, based on the compared signal qualities, wherein the singled out port is one of two ports having the lowest signal qualities from among the plurality of ports; and adjusting the operating voltage of the network IC based on the signal quality of the singled out port.

11. The method of claim 10, wherein the signal quality of the port for arbitration represents the signal qualities of the plurality of ports.

12. The method of claim 10, further comprising the steps of:

decreasing the operating voltage by a voltage unit of A when the signal quality of the singled out port is larger than a first threshold; and increasing the operating voltage to a default operating voltage when the signal quality of the singled out port is smaller than the first threshold.

13. The method of claim 10, further comprising the steps of:

decreasing the operating voltage by a voltage unit of B when the signal quality of the singled out port is larger than an M-th threshold; and increasing the operating voltage by a voltage unit of C when the signal quality of the singled out port is smaller than the M-th threshold;

wherein M is an integer larger than or equal to 2.

14. The method of claim 13, wherein the voltage units of B and C are changed as M changes.

15. The method of claim 10, wherein the signal quality is a signal-to-noise ratio (SNR).

16. A method for adjusting an operating voltage of a network integrated circuit (IC), comprising the steps of:

comparing signal qualities of a plurality of ports of the network IC;

singling out one of the ports for arbitration, based on the compared signal qualities, wherein the singled out port is one having a mean or/and a median signal quality of the plurality of ports; and adjusting the operating voltage of the network IC based on the signal quality of the singled out port.

17. The method of claim 16, wherein the signal qualities are signal-to-noise ratios (SNRs).

* * * * *